United States Patent
Mizutani et al.

(10) Patent No.: US 11,258,076 B2
(45) Date of Patent: Feb. 22, 2022

(54) ELECTRODE CATALYST FOR FUEL CELL, METHOD OF PRODUCING THE SAME, AND FUEL CELL

(71) Applicants: TOYOTA JIDOSHA KABUSHIKI KAISHA, Toyota (JP); CATALER CORPORATION, Kakegawa (JP); NIPPON STEEL Chemical & Material Co., Ltd., Tokyo (JP)

(72) Inventors: Nobuaki Mizutani, Toyota (JP); Yusuke Itoh, Toyota (JP); Toru Yamamoto, Toyota (JP); Kotaro Horiai, Kakegawa (JP); Mikihiro Kataoka, Kakegawa (JP); Yuki Makino, Kakegawa (JP)

(73) Assignees: Toyota Jidosha Kabushiki Kaisha, Toyota (JP); Cataler Corporation, Kakegawa (JP); Nippon Steel Chemical & Material Co., Ltd., Tokyo (JP)

(*) Notice: Subject to any disclaimer, the term of this patent is extended or adjusted under 35 U.S.C. 154(b) by 42 days.

(21) Appl. No.: 16/467,677

(22) PCT Filed: Dec. 11, 2017

(86) PCT No.: PCT/IB2017/001589
§ 371 (c)(1),
(2) Date: Jun. 7, 2019

(87) PCT Pub. No.: WO2018/104775
PCT Pub. Date: Jun. 14, 2018

(65) Prior Publication Data
US 2020/0075964 A1    Mar. 5, 2020

(30) Foreign Application Priority Data

Dec. 9, 2016  (JP) .............................. JP2016-239233
Dec. 7, 2017  (JP) .............................. JP2017-235057

(51) Int. Cl.
*H01M 4/00* (2006.01)
*H01M 4/92* (2006.01)
(Continued)

(52) U.S. Cl.
CPC ......... *H01M 4/926* (2013.01); *H01M 4/8807* (2013.01); *H01M 4/8817* (2013.01);
(Continued)

(58) Field of Classification Search
CPC ......... H01M 4/926; H01M 2008/1095; H01M 2004/021; H01M 2004/8684;
(Continued)

(56) References Cited

U.S. PATENT DOCUMENTS 9,656,870 B2    5/2017  Nishi et al.
2011/0195339 A1  8/2011  Iijima et al.
(Continued)

FOREIGN PATENT DOCUMENTS

EP      2 990 104 A1   3/2016
JP      2006-164575 A  6/2006
(Continued)

OTHER PUBLICATIONS

Ito, Toshihiko, et al. "Three-dimensional spatial distributions of Pt catalyst nanoparticles on carbon substrates in polymer electrolyte fuel cells." Electrochemistry 79.5 (2011): 374-376. (Year: 2011).*

(Continued)

*Primary Examiner* — Nicholas P D'Aniello
(74) *Attorney, Agent, or Firm* — Finnegan, Henderson, Farabow, Garrett & Dunner, LLP

(57) ABSTRACT

The present invention relates to an electrode catalyst for a fuel cell that includes a carbon support (11) having pores (13) and catalyst particles containing platinum or a platinum alloy supported on the carbon support (11). The pores (13) of the carbon support (11) have a mode size of pores (13) in
(Continued)

a range of 2.1 nm to 5.1 nm. A total pore volume of the pores (13) of the carbon support (11) is in a range of 21 cm$^3$/g to 35 cm$^3$/g. A distance between the catalyst particles and a surface of the carbon support (11) is in a range of 2.0 nm to 12 nm as a distance of a 50% cumulative frequency.

7 Claims, 3 Drawing Sheets

(51) Int. Cl.
*H01M 4/88* (2006.01)
*H01M 8/1018* (2016.01)

(52) U.S. Cl.
CPC ........ *H01M 4/8842* (2013.01); *H01M 4/8882* (2013.01); *H01M 2008/1095* (2013.01)

(58) Field of Classification Search
CPC ............. H01M 4/8807; H01M 4/8817; H01M 4/8842; H01M 4/8882; H01M 4/88; H01M 4/92; H01M 8/10; Y02E 60/50
See application file for complete search history.

(56) References Cited

U.S. PATENT DOCUMENTS

| | | |
|---|---|---|
| 2014/0205929 A1 | 7/2014 | Mashio et al. |
| 2015/0065341 A1 | 3/2015 | Erlebacher et al. |
| 2016/0079605 A1 | 3/2016 | Mashio et al. |
| 2016/0087281 A1 | 3/2016 | Mashio et al. |
| 2016/0329571 A1 | 11/2016 | Matsumoto et al. |
| 2017/0194652 A1* | 7/2017 | Iijima ............... C01B 32/05 |
| 2018/0166696 A1 | 6/2018 | Itoh et al. |

FOREIGN PATENT DOCUMENTS

| | | |
|---|---|---|
| JP | 5397241 B | 1/2014 |
| JP | 5481748 B2 | 2/2014 |
| JP | 5877494 B2 | 2/2016 |
| WO | WO2010/047415 A1 | 4/2010 |
| WO | WO2014/175098 A1 | 10/2014 |
| WO | WO2014/175099 A1 | 10/2014 |
| WO | WO2014/175100 A1 | 10/2014 |
| WO | WO2014/175101 A1 | 10/2014 |
| WO | WO2015/088025 A1 | 6/2015 |
| WO | WO2015/141810 A1 | 9/2015 |

OTHER PUBLICATIONS

U.S. Appl. No. 15/832,911, filed Dec. 6, 2017.
Young-Chul Park et al., "Effects of Carbon Supports on Pt Distribution, Ionomer Coverage and Cathode Performance for Polymer Electrolyte Fuel Cells," Journal of Power Sources, vol. 315, Mar. 21, 2016, pp. 179-191.

\* cited by examiner

ELECTRODE CATALYST FOR FUEL CELL, METHOD OF PRODUCING THE SAME, AND FUEL CELL

BACKGROUND OF THE INVENTION

1. Field of the Invention

The present invention relates to an electrode catalyst for a fuel cell, a method of producing the same, and a fuel cell.

2. Description of Related Art

In a fuel cell, power is obtained by electrochemically reacting hydrogen with oxygen. A product generated according to power generation of a fuel cell is, in principle, only water. Therefore, the fuel cell has been focused upon as a clean power generation system with little burden on the global environment.

In a fuel cell, an electromotive force is obtained by supplying a fuel gas containing hydrogen to the side of an anode (fuel electrode) and supplying an oxidant gas containing oxygen to the side of a cathode (air electrode). An oxidation reaction proceeds on the side of the anode, and a reduction reaction proceeds on the side of the cathode, and an electromotive force is supplied to an external circuit.

Fuel cells are classified into polymer electrolyte fuel cells (PEFC), phosphoric acid fuel cells (PAFC), molten carbonate fuel cells (MCFC), and solid oxide fuel cells (SOFC) according to types of electrolyte. Among them, in PEFC and PAFC, an electrode catalyst including a conductive support such as a carbon support and particles of a catalytic metal having catalytic activity (hereinafter referred to as "catalyst particles") such as platinum or a platinum alloy supported on the conductive support is generally used.

Generally, the carbon support used in the electrode catalyst has a high specific surface area in order to increase a support density of catalyst particles. As a carbon support having a high specific surface area, a carbon support having a plurality of pores may be exemplified.

For example, WO 2014/175100 describes a catalyst including a catalyst support and a catalytic metal supported on the catalyst support. In the catalyst, the mode radius of the pore distribution of the pores is 1 nm or more and less than 5 nm. The catalytic metal is supported inside the pores, and the mode radius is equal to or less than an average particle radius of the catalytic metal. A pore volume of the pores is 0.4 cc/g support or more.

Japanese Unexamined Patent Application Publication No. 2006-164575 (JP 2006-164575 A) describes an electrode catalyst layer for a polymer electrolyte fuel cell, which is a water-repellent electrode catalyst layer in which 1) the electrode catalyst layer includes a solid polymer electrolyte and a catalyst material, 2) the catalyst material is obtained by supporting a catalytically active component on a surface of a carbon material, and 3) the electrode catalyst layer form a water repellent layer on a part or the whole of at least one surface.

Japanese Patent No. 5481748 describes a dendritic carbon nanostructure in which a carbon-containing rod-shaped body or annular body branches, and having the BET specific surface area of 870 m²/g or more. Japanese Patent No. 5481748 also describes a method of producing a carbon nanostructure. The method includes a process in which a solution containing a metal or a metal salt is prepared, a process in which acetylene gas is blown into the solution while ultrasonic waves are applied and a dendritic crystal body containing the metal and carbon is produced, a process in which a first heating treatment is performed on the dendritic crystal body, the metal in the dendritic crystal body is isolated, and a metal contained dendritic carbon nanostructure in which the metal is contained is produced in a dendritic carbon nanostructure in which the carbon-containing rod-shaped body or annular body branches, and a process in which a second heating treatment is performed on the metal contained dendritic carbon nanostructure, and the metal contained in the metal contained dendritic carbon nanostructure is erupted.

WO 2015/141810 discloses a support carbon material (i.e., carbon material for a support) for a polymer electrolyte fuel cell, which is a porous carbon material and in which a specific surface area SA of mesopores with a pore size of 2 nm to 50 nm, which is obtained by analyzing a nitrogen adsorption isotherm in an adsorption process using a Dollimore-Heal method, is 600 m²/g or more and 1600 m²/g or less, a relative intensity ratio (IG'/IG) between a peak intensity (IG') of a peak within a G'-band range from 2650 cm$^{-1}$ to 2700 cm$^{-1}$ and a peak intensity (IG) of a peak within a G-band range from 1550 cm$^{-1}$ to 1650 cm$^{-1}$ in a Raman spectroscopy spectrum is 0.8 to 2.2, and a peak position of the G'-band is 2660 cm$^{-1}$ to 2670 cm$^{-1}$. WO 2015/141810 discloses a method of producing a support carbon material for a polymer electrolyte fuel cell. The method includes an acetylide generating process in which acetylene gas is blown into a metal or metal salt-containing solution to generate a metal acetylide, a first heating treatment process in which the metal acetylide is heated to produce a metal particle containing intermediate in which metal particles are contained, a second heating treatment process in which the metal particle containing intermediate is compacted and molded, the temperature of the obtained molded body is raised by heating, and metal particles are erupted from the metal particle containing intermediate to obtain a carbon material intermediate, a cleaning process in which the carbon material intermediate obtained in the second heating treatment process is brought into contact with hot concentrated nitric acid or concentrated sulfuric acid to clean the carbon material intermediate, and a third heating treatment process in which the carbon material intermediate cleaned in the cleaning process is heated to obtain a support carbon material.

SUMMARY OF THE INVENTION

In fuel cells such as a PEFC, a form of an electrode catalyst of which a surface is covered with a polymer electrolyte (hereinafter referred to as an "ionomer") is generally used. In such a form, a catalytic metal (for example, platinum) included in an electrode catalyst for a fuel cell may be poisoned by a strongly acidic group (for example, a sulfonic acid group) of an ionomer and catalytic activity may be lowered. A carbon support having a plurality of pores is useful for avoiding poisoning of a catalytic metal by an ionomer and obtaining an electrode catalyst for a fuel cell in which catalyst particles are supported with a high support density. However, there is room for improvement in performance for an electrode catalyst for a fuel cell using such a carbon support.

For example, in the catalyst described in WO 2014/175100, in order to avoid poisoning of a catalytic metal by the ionomer coated on the surface of the catalyst, the catalytic metal is supported inside pores of the catalyst. In addition, in order to reduce an amount of water inside pores, the mode radius of pores is smaller than the average particle radius of the catalytic metal. However, in the catalyst described in WO 2014/175100, since it is difficult to discharge water inside pores, a phenomenon (hereinafter referred to as "flooding") in which water accumulates inside pores may occur. When such a phenomenon occurs, since it is difficult for oxygen and/or hydrogen to reach the inside of the pores of the support, the gas diffusion resistance of a fuel cell obtained as a result may increase. In this case, an overvoltage may occur in an electrode and performance of the fuel cell may deteriorate.

In the electrode catalyst layer described in JP 2006-164575 A, in order to avoid an increase in gas diffusion resistance due to flooding, a water repellent treatment is performed on the surface of the carbon material. However, when the support of the electrode catalyst is subjected to a water repellent treatment, a water-retaining property of the electrode catalyst deteriorates. Thus, when the fuel cell obtained as a result is operated at a high temperature, performance of the fuel cell may deteriorate.

Therefore, the present invention provides a technology for substantially improving catalytic activity and/or substantially preventing gas diffusion resistance of a fuel cell from increasing by improving gas circulation inside a carbon support in an electrode catalyst for a fuel cell.

The inventors have studied various methods for solving the problems. The inventors found that, when a carbon support having a plurality of pores is degassed under predetermined conditions and a catalytic metal is then supported, catalyst particles can be supported inside the pores and at positions within a predetermined distance range from a surface of the carbon support. In addition, the inventors found that a fuel cell obtained using the electrode catalyst has low gas diffusion resistance while maintaining mass activity. The inventors completed the present invention based on these findings.

A first aspect of the present invention relates to an electrode catalyst for a fuel cell that includes a carbon support having pores and catalyst particles containing platinum or a platinum alloy supported on the carbon support. The pores of the carbon support have a mode size of pores in a range of 2.1 nm to 5.1 nm. A total pore volume of the pores of the carbon support is in a range of 21 cm$^3$/g to 35 cm$^3$/g. A distance between the catalyst particles and a surface of the carbon support is in a range of 2.0 nm to 12 nm as a distance of a 50% cumulative frequency.

A distance between the catalyst particles and a surface of the carbon support may be in a range of 3.0 nm to 12 nm as a distance of a 50% cumulative frequency.

The particle size of the catalyst particles may be in a range of 2.5 nm to 5.1 nm.

The catalyst particles may have a support density in a range of 20 mass % to 50 mass %.

A second aspect of the present invention relates to a fuel cell including the electrode catalyst for a fuel cell.

A third aspect of the present invention relates to a production method of producing the electrode catalyst for a fuel cell of the first aspect. The method includes a degassing process in which, in a carbon support which has pores and in which the pores of the carbon support have a mode size of pores in a range of 2.1 nm to 5.1 nm and a total pore volume of the pores of the carbon support is in a range of 21 cm$^3$/g to 35 cm$^3$/g, the carbon support is dispersed in water, and the carbon support is degassed until a proportion of the volume of pores in which water has entered with respect to a total pore volume of the pores of the carbon support is in a range of 33% to 68%; a catalytic metal salt supporting process in which the carbon support obtained in the degassing process is reacted with a catalytic metal material containing a salt of a catalytic metal and the catalytic metal material is supported on the carbon support; and a catalyst particle forming process in which the salt of the catalytic metal contained in the catalytic metal material supported on the carbon support obtained in the catalytic metal salt supporting process is reduced to form platinum or a platinum alloy in a metallic form.

The production method further may include a metal-containing solution preparing process in which a metal-containing solution that contains a metal or a salt thereof is prepared before the degassing process; a metal acetylide forming process in which a metal-containing solution and acetylene gas are mixed to form a metal acetylide; a first heating treatment process in which the metal acetylide is heated at a temperature in a range of 40° C. to 80° C. to form a metal particle containing intermediate; and a second heating treatment process in which the metal particle containing intermediate is heated so that pores is formed in the carbon support by erupting the metal contained in the metal particle containing intermediate while the temperature is raised to a range of 100° C. to 200° C. at a temperature raising rate in a range of 5° C./min to 100° C./min, and in which the pores of the carbon support have a mode size of pores in a range of 2.1 nm to 5.1 nm, and a total pore volume of the pores of the carbon support is in a range of 21 cm$^3$/g to 35 cm$^3$/g is obtained.

According to the present invention, it is possible to provide a technology for substantially improving catalytic activity and/or substantially preventing gas diffusion resistance of a fuel cell from increasing by improving gas circulation inside a carbon support in an electrode catalyst for a fuel cell.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<1. Electrode Catalyst for Fuel Cell>

An embodiment of the present invention relates to an electrode catalyst for a fuel cell. The electrode catalyst for a fuel cell of the present embodiment needs to include a carbon support and catalyst particles supported on the carbon support.

In the electrode catalyst for a fuel cell, a carbon support having a high specific surface area is used to improve activity by supporting catalyst particles with a high dispersion and high support density. As the carbon support having a high specific surface area, a porous carbon support having a plurality of pores may be exemplified. In such an electrode catalyst, according to a structure in which catalyst particles are supported inside pores on the carbon support, when the electrode catalyst is covered with an ionomer, catalyst particles inside pores are prevented from being covered with the ionomer, and a decrease in effective reactive surface area of catalyst particles may be avoided. On the other hand, in the electrode catalyst having such a structure, as a result of flooding in which water accumulates in pores, since it is difficult for oxygen and/or hydrogen gas to reach the inside of pores, a gas diffusion resistance of a fuel cell obtained as a result may increase. In this case, an overvoltage may occur in an electrode and performance of the fuel cell may deteriorate.

An electrode catalyst in which catalyst particles are supported on a carbon support that has undergone a water repellent treatment in order to avoid an increase in gas diffusion resistance due to flooding is known (JP 2006-164575 A). However, when a water repellent treatment is performed on a support of an electrode catalyst, a water-retaining property of the electrode catalyst deteriorates. Thus, when the fuel cell obtained as a result is operated at a high temperature, performance of the fuel cell may deteriorate.

The inventors found that, when a carbon support having a plurality of pores with a predetermined pore size and pore volume is degassed under predetermined conditions and a catalytic metal is then supported, catalyst particles can be supported inside the pores and at positions within a predetermined distance range from a surface of the carbon support. When the electrode catalyst for a fuel cell of the present embodiment having such a structure is used, it is possible to substantially prevent a decrease in performance such as that of a mass activity of a fuel cell and substantially prevent an increase in gas diffusion resistance.

The gas diffusion resistance and the catalytic activity of the electrode catalyst for a fuel cell of the present embodiment can be evaluated as follows. For example, a membrane electrode assembly (MEA) of a fuel cell including an electrode catalyst for the fuel cell for an anode and/or a cathode is produced. Evaluation tests of gas diffusion resistance, I-V characteristics, and mass activity which are generally used in the technical field can be performed using the MEA for evaluation.

Figure 1:
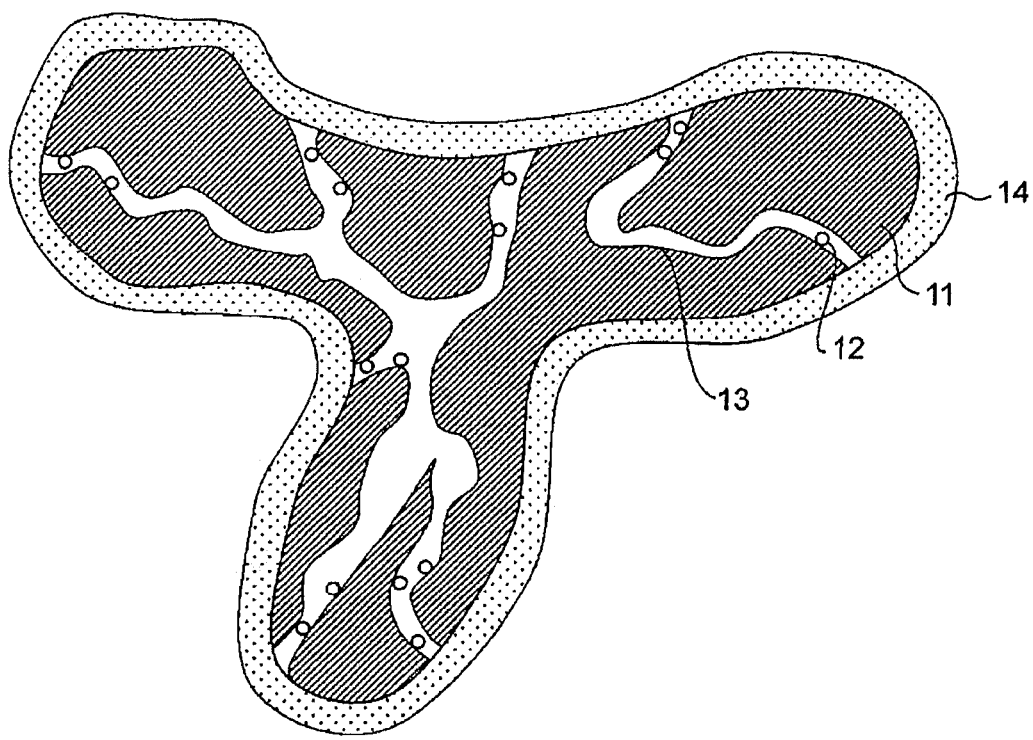
FIG. 1 is a sectional view schematically showing a form of an electrode catalyst for a fuel cell according to an embodiment of the present invention.
Figure 2A:
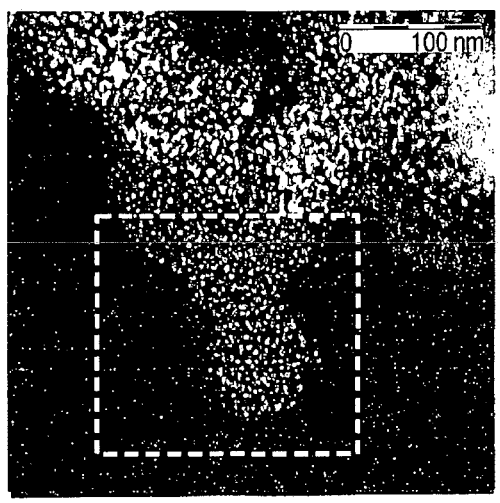
FIG. 2A is a 3D-TEM image of an electrode catalyst showing a 3-dimensional transmission electron microscope (3D-TEM) image of an electrode catalyst of Example 2.
Figure 2B:
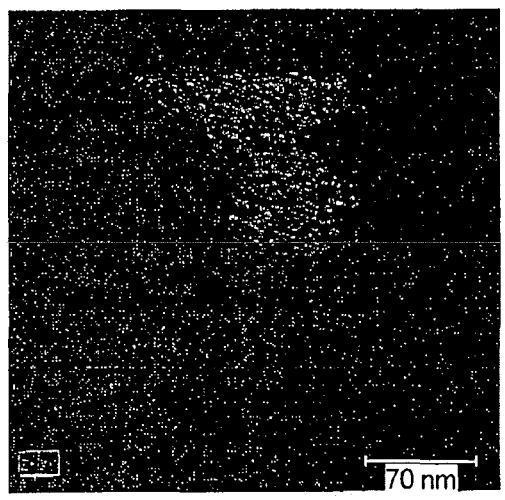
FIG. 2B is an enlarged image of a part indicated by an enclosure line in the 3D-TEM image in FIG. 2A.

FIG. 1 is a sectional view schematically showing a form of an electrode catalyst for a fuel cell according to an embodiment of the present embodiment. The electrode catalyst for a fuel cell of the present embodiment includes a carbon support 11 and catalyst particles 12 supported on the carbon support 11. The carbon support 11 included in the electrode catalyst for a fuel cell of the present embodiment includes pores 13. The number of pores 13 is generally plural. At least one end of each pore 13 may form an opening of the surface of the carbon support 11 and the remaining end of the pore 13 may be positioned inside the carbon support 11. Alternatively, all end portions of each pore 13 form openings of the surface of the carbon support 11. In the present disclosure, the surface of the carbon support does not include surfaces of pores.

In the electrode catalyst for a fuel cell of the present embodiment, the pores 13 need to have a mode size of pores in a range of 2.1 nm to 5.1 nm. In the present disclosure, a mode size of pores in a carbon support means a pore size having the highest appearance ratio in the pore size distribution of the carbon support. A mode size of pores is preferably in a range of 2.1 nm to 4.1 nm, and more preferably in a range of 3.5 nm to 4.1 nm. As will be described below, the catalyst particles included in the electrode catalyst for a fuel cell of the present embodiment preferably have a particle size in a range of 2.5 nm to 5.1 nm. Here, in the electrode catalyst for a fuel cell of the present embodiment, when a mode size of pores in the carbon support is equal to or greater than the lower limit value, the catalyst particles are highly likely to be supported inside the pores. In addition, as shown in FIG. 1, when the mode size of pores 13 in the carbon support 11 is equal to or lower than the upper limit value, an ionomer 14 is less likely to enter the inside of the pores 13. When such an electrode catalyst for a fuel cell is applied to a fuel cell, it is possible to substantially prevent the catalyst particles from being directly covered with an ionomer and a decrease in effective reactive surface area of the catalyst particles. Therefore, when a mode size of pores in the carbon support is within this range, it is possible to substantially prevent deterioration in performance of the fuel cell.

A mode size of pores in the carbon support can be determined based on a pore size indicating the maximum value of a logarithmic derivative pore volume in a pore size distribution curve showing the relationship between a pore size (D) of a carbon support obtained by a method, for example, a Barrett-Joyner-Halenda (BJH) method, and the logarithmic derivative pore volume (dV/d (log D)). The total pore volume is a cumulative value of the logarithmic derivative pore volumes (dV/d (log D)) at the respective pore sizes. When the BJH method is applied, the pore size distribution curve can be obtained by, for example, the following procedure. In nitrogen gas at 77.4 K (boiling point of nitrogen), while a pressure P (mm Hg) of nitrogen gas is gradually increased, a nitrogen gas adsorption amount (ml/g) of a carbon support is measured at each pressure P. Next, a value obtained by dividing a pressure P (mm Hg) by a saturated vapor pressure $P_0$ (mm Hg) of nitrogen gas is set as a relative pressure $P/P_0$, a nitrogen gas adsorption amount with respect to each relative pressure $P/P_0$ is plotted, and thus an adsorption isotherm is obtained. Then, a pore size distribution of the carbon support is obtained from the adsorption isotherm according to the BJH method. In this manner, the pore size distribution curve can be obtained. Here, regarding the BJH method, published literature, for example, J. Am. Chem. Soc., 1951, Vol. 73, p. 373 to 380, can be referred to.

A total pore volume of pores in the carbon support needs to be in a range of 21 cm$^3$/g to 35 cm$^3$/g. In the present disclosure, the total pore volume of the pores of the carbon support means a total value of pore volumes of all pores in the carbon support. The total pore volume is preferably in a range of 28 cm$^3$/g to 35 cm$^3$/g and more preferably about 35 cm$^3$/g. When a total pore volume of pores in the carbon support is equal to or greater than the lower limit value, the pores may be connected to each other inside the carbon support. According to such a structure, since oxygen and/or hydrogen gas are likely to diffuse through the connected pores, gas diffusion resistance may decrease. In addition, water produced according to a reaction due to the connected pores is likely to be discharged to the outside of the carbon support. Therefore, when a total pore volume of pores in the carbon support is within this range, it is possible to substantially prevent an increase in gas diffusion resistance.

The total pore volume of pores in the carbon support can be determined based on, for example, a pore size distribution curve indicating the relationship between a pore size of a carbon support and an integral pore volume.

The carbon support having the structure described above can be obtained, for example, by performing, a metal-containing solution preparing process, a metal acetylide forming process, a first heating treatment process and a second heating treatment process in a method of producing an electrode catalyst for a fuel cell according to an embodiment of the present invention to be described below. Alternatively, the carbon support having the structure described above may be purchased. Any carbon support that has the structure described above can be applied to the electrode catalyst for a fuel cell of the present embodiment.

In the electrode catalyst for a fuel cell of the present embodiment, a distance between catalyst particles and a surface of a carbon support needs to be in a range of 2.0 nm to 12 nm. In the present disclosure, a distance between catalyst particles and a surface of a carbon support means a value that is defined as a distance of a 50% cumulative frequency. A distance between catalyst particles and a surface of a carbon support is preferably in a range of 3.0 nm to 12 nm, more preferably in a range of 3.5 nm to 12 nm, and most preferably in a range of 3.5 nm to 10 nm. When a distance between catalyst particles and a surface of a carbon support is equal to or greater than the lower limit value, a catalyst particle is highly likely to be supported inside a pore. When such an electrode catalyst for a fuel cell is applied to a fuel cell, it is possible to substantially prevent the catalyst particles from being directly covered with an ionomer and a decrease in effective reactive surface area of the catalyst particles. Therefore, when a distance between catalyst particles and a surface of a carbon support is equal to or greater than the lower limit value, it is possible to substantially prevent deterioration in performance of the fuel cell. In addition, when a distance between catalyst particles and a surface of a carbon support is equal to or less than the upper limit value, since oxygen and/or hydrogen gas are likely to diffuse to the catalyst particles through the pores, gas diffusion resistance may decrease. In addition, water produced according to a reaction due to connected pores is likely to be discharged to the outside of the carbon support. Therefore, when a distance between catalyst particles and a surface of a carbon support is equal to or less than the upper limit value, it is possible to substantially prevent an increase in gas diffusion resistance.

A distance between catalyst particles and a surface of a carbon support can be determined according to, for example, the following method. Using a 3-dimensional transmission electron microscope (3D-TEM), the electrode catalyst for a fuel cell of the present embodiment is observed, a carbon support (white transmission image) and a catalytic metal (black non-transmission image) being able to be distinguished. Catalyst particles containing a catalytic metal are identified one by one, and the closest distance between catalyst particles and a surface of a carbon support is measured using computation software for processing. The validity of computation results is checked with reference to results from observation using the 3D-TEM. The closest distance between catalyst particles and a surface of a carbon support is measured for all catalyst particles included in powder particles of one electrode catalyst. The relationship between a distance between catalyst particles and a surface of a carbon support and the number of catalyst particles having this distance is represented by a histogram. In addition, a cumulative frequency curve of a distance between catalyst particles and a surface of a carbon support is obtained from the histogram. From the cumulative frequency curve, a distance at which a distance between catalyst particles and a surface of a carbon support has a 50% cumulative frequency is determined. For each electrode catalyst for a fuel cell, about ten electrode catalyst powder particles are extracted, an experiment is performed according to the procedure, and an average value of distances at which a 50% cumulative frequency is obtained is calculated.

Catalyst particles included in the electrode catalyst for a fuel cell of the present embodiment need to include platinum (Pt) or a platinum alloy as a catalytic metal. The catalyst particles preferably include a platinum alloy. The platinum alloy is generally made of Pt and at least one additional metal. In this case, as at least one additional metal that forms a platinum alloy, cobalt (Co), gold (Au), palladium (Pd), nickel (Ni), manganese (Mn), iridium (Ir), iron (Fe), copper (Cu), titanium (Ti), tantalum (Ta), niobium (Nb), yttrium (Y), and a lanthanide element such as gadolinium (Gd), lanthanum (La) and cerium (Ce) may be exemplified. The at least one additional metal is preferably Co, Au, Pd, Ni, Mn, Cu, Ti, Ta or Nb, and more preferably Co. Preferably, a catalytic metal is Pt or Pt$_3$Co. When catalyst particles included in the electrode catalyst for a fuel cell of the present embodiment include the catalytic metal, it is possible to obtain an electrode catalyst having high activity and high durability.

Catalyst particles included in the electrode catalyst for a fuel cell of the present embodiment preferably have a support density in a range of 20 mass % to 50 mass %, and more preferably have a support density in a range of 30 mass % to 50 mass %. In the present disclosure, a support density of catalyst particles means a percentage of the mass of the catalyst particles, preferably Pt, with respect to the total mass of the electrode catalyst. When the support density of the catalyst particles is equal to or less than the upper limit value, the catalyst particles are highly likely to be supported inside the pores of the carbon support. When such an electrode catalyst for a fuel cell is applied to a fuel cell, it is possible to substantially prevent the catalyst particles from being directly covered with an ionomer and a decrease in effective reactive surface area of the catalyst particles. Therefore, when the support density of the catalyst particles is within this range, it is possible to substantially prevent deterioration in performance of the fuel cell.

The composition and the support density of the catalyst particles included in the electrode catalyst for a fuel cell of the present embodiment can be determined by dissolving a catalytic metal included in catalyst particles from the electrode catalyst using, for example, aqua regia, and then quantifying catalytic metal ions in the solution using an inductively coupled plasma (ICP) emission spectrometer.

The catalyst particles included in the electrode catalyst for a fuel cell of the present embodiment preferably have a particle size in a range of 2.5 nm to 5.1 nm, more preferably have a particle size in a range of 2.5 nm to 4.1 nm, and most preferably have a particle size in a range of 3.0 nm to 4.1 nm. When the particle size of the catalyst particles is within this range, the catalyst particles are highly likely to be supported inside the pores of the carbon support. When such an electrode catalyst for a fuel cell is applied to a fuel cell, it is possible to substantially prevent the catalyst particles from being directly covered with an ionomer and a decrease in effective reactive surface area of the catalyst particles. Therefore, when the particle size of the catalyst particles is within this range, it is possible to substantially prevent deterioration in performance of the fuel cell. In addition, when the particle size of the catalyst particles is within this range, it is possible to obtain an electrode catalyst for a fuel cell having high catalyst particle durability.

In general, a particle size of catalyst particles included in an electrode catalyst for a fuel cell increases when a calcination temperature after the catalyst particles are supported increases in production of the electrode catalyst for a fuel cell. Specific conditions for obtaining catalyst particles having a particle size in this range can be determined when, in consideration of this factor, a preliminary experiment is performed in advance, a correlation with conditions of a calcining process is acquired, and the correlation is applied. According to such a method, it is possible to obtain catalyst particles having a particle size in this range.

The particle size of the catalyst particles can be determined according to, for example, the following method. Using an X-ray diffraction (XRD) device, XRD of the catalyst particles included in the electrode catalyst for a fuel cell of the present embodiment is measured. In the obtained XRD, a normal distribution curve is fitted to a peak pattern corresponding to the plane (220) of a catalytic metal crystal included in the catalyst particles. The half width of the fitted normal distribution curve is computed, and the particle size of the catalyst particles is calculated based on the obtained half width according to a known method (such as JISH7805).

The electrode catalyst for a fuel cell of the present embodiment can be applied for both an anode and a cathode of a fuel cell. Here, another embodiment of the present invention relates to a fuel cell including the electrode catalyst for a fuel cell according to the embodiment of the present invention. The fuel cell of the present embodiment includes the electrode catalyst for a fuel cell according to the embodiment of the present invention for at least one of an anode and a cathode and further includes an ionomer and if necessary, an anode or a cathode. As materials other than the electrode catalyst for a fuel cell according to the embodiment of the present invention, an anode, a cathode, and an ionomer used in the fuel cell of the present embodiment can be appropriately selected from among materials that are generally used in the technical field.

In the fuel cell of the present embodiment, the ionomer is generally disposed on the surface of the electrode catalyst for a fuel cell according to the embodiment of the present invention included for at least one of an anode and a cathode. That is, in the fuel cell of the present embodiment, the electrode catalyst for a fuel cell according to the embodiment of the present invention is generally covered with an ionomer. In this case, a ratio (hereinafter referred to as an "ionomer coating ratio") of a surface area of an electrode catalyst covered with the ionomer with respect to a total surface area of the electrode catalyst for a fuel cell according to the embodiment of the present invention is preferably in a range of 60% to 75% and more preferably in a range of 60% to 70%. When the ionomer coating ratio is in this range, it is possible to substantially prevent deterioration in performance of the fuel cell.

The ionomer coating ratio can be determined, for example, if an MEA of the fuel cell of the present embodiment is produced, cyclic voltammetry (CV) measurement using a nonaqueous solvent and an aqueous solvent is performed using the MEA, and a surface area of the electrode catalyst for a fuel cell and a surface area of the electrode catalyst covered with the ionomer are measured.

In the fuel cell of the present embodiment, when the electrode catalyst for a fuel cell according to the embodiment of the present invention is applied to at least one of an anode and a cathode, it is possible to avoid an increase in gas diffusion resistance and it is possible to substantially prevent deterioration in performance of the fuel cell. Therefore, when the fuel cell of the present embodiment is applied to automotive applications and the like, it is possible to substantially prevent deterioration in performance even during long time use, such that stable high performance is able to be exhibited.

<2: Method of Producing Electrode Catalyst for Fuel Cell>

The inventors found that, when a carbon support having a plurality of pores is degassed under predetermined conditions and a catalytic metal is then supported, catalyst particles can be supported inside the pores and at positions within a predetermined distance range from a surface of the carbon support. In addition, the inventors found that a carbon support in which pores with a predetermined pore size and pore volume is formed in predetermined ranges is obtained by optimizing heating treatment conditions of a metal contained dendritic carbon nanostructure or a metal particle containing intermediate in the method of producing a carbon nanostructure described in Japanese Patent No. 5481748 or the method of producing a porous carbon material described in WO 2015/141810. Here, still another embodiment of the present invention relates to a method of producing the electrode catalyst for a fuel cell according to the embodiment of the present invention described above. The method of the present embodiment needs to include a degassing process, a catalytic metal salt supporting process, and a catalyst particle forming process. The method of the present embodiment can include, optionally, a metal-containing solution preparing process, a metal acetylide forming process, a first heating treatment process, and a second heating treatment process. The processes will be described as follows.

[2-1: Metal-Containing Solution Preparing Process]

The method of the present embodiment can include optionally a metal-containing solution preparing process in which a metal-containing solution that contains a metal or a salt thereof is prepared. In the present process, a metal contained in the metal-containing solution is preferably silver or copper or a metal salt is preferably silver nitrate or copper sulfate. The present process can be performed in the same manner as in the process in the method described in, for example, Japanese Patent No. 5481748 or WO 2015/141810.

[2-2: Metal Acetylide Forming Process]

The method of the present embodiment can include optionally a metal acetylide forming process in which a metal-containing solution and acetylene gas are mixed to form a metal acetylide. The present process can be performed in the same manner as in the process in the method described in, for example, Japanese Patent No. 5481748 or WO 2015/141810. When the present process is performed, it is possible to form a metal acetylide having a dendritic structure.

[2-3: First Heating Treatment Process]

The method of the present embodiment can include optionally a first heating treatment process in which the metal acetylide is heated to form a metal particle containing intermediate. The present process can be performed in the same manner as in the process in the method described in, for example, Japanese Patent No. 5481748 or WO 2015/141810.

In the present process, a temperature at which the metal acetylide is heated is preferably in a range of 40° C. to 80° C. and more preferably in a range of 60° C. to 80° C. A time for which the metal acetylide is heated is preferably 12 hours or longer. When the present process is performed under these conditions, it is possible to form a metal contained dendritic carbon nanostructure that contains a metal and has a dendritic structure.

[2-4: Second Heating Treatment Process]

The method of the present embodiment can include optionally a second heating treatment process in which a heating treatment is performed while increasing the temperature of the metal particle containing intermediate, and the metal contained in the metal particle containing intermediate is erupted. The present process can be performed in the same manner as in the process in the method described in, for example, Japanese Patent No. 5481748 or WO 2015/141810.

In the present process, a temperature raising rate when the metal particle containing intermediate is heated is preferably in a range of 5° C./min to 100° C./min and more preferably in a range of 10° C./min to 90° C./min. A temperature at which a heating treatment is performed after the temperature of the metal particle containing intermediate is raised is preferably in a range of 100° C. to 200° C., more preferably in a range of 150° C. to 200° C., and most preferably in a range of 160° C. to 200° C. A time for which the metal particle containing intermediate is heated is preferably in a range of 1 minute to 60 minutes, and more preferably in a range of 10 minutes to 30 minutes. When the present process is performed under these conditions, it is possible to erupt metal particles from the metal particle containing intermediate and form pores having a predetermined shape in the carbon support. Thus, it is possible to obtain a carbon support having pores in which the pores of the carbon support have a mode size of pores in a range of 2.1 nm to 5.1 nm, and a total pore volume of the pores of the carbon support is in a range of 21 $cm^3/g$ to 35 $cm^3/g$.

In the present process, optionally, a cleaning process in which the intermediate obtained by erupting metal particles is brought into contact with hot concentrated nitric acid or concentrated sulfuric acid to clean the intermediate and a third heating treatment process in which the intermediate cleaned in the cleaning process is heated to obtain a carbon support having pores may be additionally performed. The cleaning process and the third heating treatment process can be performed in the same manner as in the processes in the method described in, for example, Japanese Patent No. 5481748 or WO 2015/141810.

[2-5: Degassing Process]

The method of the present embodiment includes a degassing process in which a carbon support having pores in which the pores of the carbon support have a mode size of pores in a range of 2.1 nm to 5.1 nm, and a total pore volume of the pores of the carbon support is in a range of 21 $cm^3/g$ to 35 $cm^3/g$ is dispersed in water and the carbon support is degassed.

A carbon support having pores in which the pores of the carbon support have a mode size of pores in a range of 2.1 nm to 5.1 nm, and a total pore volume of the pores of the carbon support is in a range of 21 $cm^3/g$ to 35 $cm^3/g$ used in the present process can be obtained by performing the metal-containing solution preparing process, the metal acetylide forming process, the first heating treatment process, and the second heating treatment process described above before the present process. Alternatively, a carbon support having the structure described above may be purchased. Either case is included in the embodiment of the present process.

When a carbon support having fine pores used in the present process disperses in water, generally, it is difficult for water to enter the inside of the pores due to surface tension. In such a case, even if the catalytic metal salt supporting process to be described below is performed, it is difficult for a catalytic metal material containing a salt of a catalytic metal to enter the inside of the pores. Therefore, in the electrode catalyst obtained as a result, catalyst particles are supported on the surface of the carbon support or an area in the vicinity thereof.

The inventors found that, when a carbon support having pores is degassed under predetermined conditions and a catalytic metal material is then supported, catalyst particles can be supported inside the pore and at positions within a predetermined distance range from a surface of the carbon support. When the carbon support having pores is degassed in an aqueous dispersion, water may enter a certain area inside the pores. Therefore, the catalytic metal material containing a salt of a catalytic metal may be supported in an area inside pores in which water has entered. Therefore, in the present process, when a degree of degassing is set within a predetermined range, it is possible to control a position at which the catalytic metal material containing a salt of a catalytic metal is supported in the following process such that it is in a predetermined distance range from a surface of the carbon support.

In the present process, it is necessary to degas the carbon support until a proportion of the volume of pores in which water has entered with respect to the total pore volume of the pores of the carbon support (hereinafter referred to as a "degassing ratio") is in a range of 33% to 68%. The degassing ratio is preferably in a range of 38% to 68%, and more preferably in a range of 39% to 68%. When the degassing ratio is within this range, in the electrode catalyst obtained as a result for a fuel cell, it is possible to set a distance between catalyst particles and a surface of a carbon support to be within a predetermined range.

The degassing ratio can be determined, for example, such that after a carbon support is immersed in a predetermined volume of water and vacuum degassing is performed, a reduction in the volume of the water is measured, and this volume as a volume of pores in which water has entered is divided by a total pore volume of the pores of the carbon support.

In the present process, the method of degassing a carbon support is not particularly limited. Degassing of the carbon support can be performed, for example, by adding an acid (for example, nitric acid, sulfuric acid, hydrochloric acid, formic acid or acetic acid) to an aqueous dispersion of the carbon support, and adjusting a pH to preferably a pH of 2. Alternatively, degassing of the carbon support can be performed by adding a water miscible organic solvent (for example, ethanol, methanol or propanol) or an aqueous solution thereof, or ozone water to an aqueous dispersion of the carbon support. Alternatively, degassing of the carbon support may be performed by dispersing an aqueous dispersion of the carbon support using an ultrasonic homogenizer with conditions of 100 W to 1500 W and 5 minutes to 100 minutes. Alternatively, degassing of the carbon support may be performed by maintaining an aqueous dispersion of the carbon support under a reduced pressure. When the carbon support is degassed by the method, specific conditions can be appropriately set by those skilled in the art while checking the degassing ratio according to the measurement method.

[2-6: Catalytic Metal Salt Supporting Process]

The method of the present embodiment includes a catalytic metal salt supporting process in which a carbon support obtained in the degassing process is reacted with the catalytic metal material containing a salt of a catalytic metal, and a catalytic metal material is supported on the carbon support.

Salts of a catalytic metal contained in the catalytic metal material used in the present process may include at least a salt of platinum. For example, when the catalytic metal is platinum, a salt of platinum is preferably hexahydroxy platinum nitrate, dinitrodiammineplatinum(II) nitric acid or a hexahydroxy platinum amine complex. When the catalytic metal is a platinum alloy, the catalytic metal material used in the present process preferably contains a salt of an additional metal that forms a platinum alloy as a salt of a catalytic metal in addition to a salt of platinum. In this case, a salt of an additional metal that forms a platinum alloy is preferably a salt of the additional metal and nitric acid or acetic acid and more preferably cobalt nitrate, nickel nitrate, manganese nitrate, cobalt acetate, nickel acetate or manganese acetate.

The present process can be performed using a reaction that is generally used in the technical field such as a colloid method or a precipitation and sedimentation method.

[2-7: Catalyst Particle Forming Process]

The method of the present embodiment includes a catalyst particle forming process in which a salt of a catalytic metal contained in a catalytic metal material supported on the carbon support obtained in the catalytic metal salt supporting process is reduced to form platinum or a platinum alloy in a metallic form.

In the present process, when the carbon support on which the catalytic metal material is supported is heated, a salt of the catalytic metal contained in the catalytic metal material supported on the carbon support is reduced. Therefore, catalyst particles supported on the carbon support containing platinum or a platinum alloy in a metallic form are formed. A temperature of the heating treatment is preferably in a range of 40° C. to 90° C. A time for the heating treatment is preferably in a range of 1 hour to 5 hours. The heating treatment is preferably performed in the presence of a reducing agent such as ethanol, hydrazine, methanol, propanol, sodium borohydride, or isopropyl alcohol. When the carbon support supporting the catalytic metal material is heated under these conditions, a salt of the catalytic metal is reduced, and catalyst particles containing platinum or a platinum alloy can be formed as a catalytic metal.

The present process may include optionally a calcining process in which the electrode catalyst including catalyst particles formed according to a heating treatment is calcined. In the calcining process, a temperature at which the electrode catalyst including catalyst particles is heated is preferably in a range of 80° C. to 900° C. A time for the calcining process is preferably in a range of 1 hour to 5 hours. When the calcining process is performed, it is possible to set the particle size of the catalyst particles to be in the range described above. In addition, when the catalytic metal material contains a salt of an additional metal that form a platinum alloy, platinum and an additional metal can be alloyed from a salt of the additional metal to form a platinum alloy in a metallic form.

According to the method of producing an electrode catalyst for a fuel cell of the present embodiment, it is possible to obtain the electrode catalyst for a fuel cell according to the embodiment of the present invention having the structure described above.

The present invention will be described below in further detail with reference to examples. However, the technical scope of the present invention is not limited to the examples.

<I: Preparation of Electrode Catalyst>

I-1-1: Example 1

(Preparation of Carbon Support)

A carbon support was prepared based on the method described in JP 2006-164575 A or Japanese Patent No. 5481748. A heating treatment temperature of the first heating treatment process was 60° C., a temperature raising rate of the second heating treatment process was 90° C./min, and a heating treatment temperature was 160° C. In the obtained carbon support, a plurality of pores had a mode size of pores in a value of 2.1 nm, and a total pore volume of the plurality of pores was 21 cm$^3$/g.

(Preparation of Electrode Catalyst Powder)

Here, 10 g of the carbon support obtained in this procedure was dispersed in pure water. A nitric acid aqueous solution was added to this dispersion solution, a pH was adjusted to 2 or less, and the carbon support was degassed. In the aqueous dispersion of the obtained carbon support, a proportion (degassing ratio) of the volume of pores in which water has entered with respect to a total pore volume of a plurality of pores of the carbon support was 39%. Here, the degassing ratio was determined such that, after a carbon support was immersed in a predetermined volume of water and vacuum degassing was performed, a reduction in the volume of water was measured, and this volume as a volume of pores in which water had entered was divided by a total pore volume of the pores of the carbon support. A dinitrodiammineplatinum(II) nitric acid solution containing a Pt loading amount (4.29 g) at which a Pt support amount was 30 mass % with respect to the total mass of the final product and 50 g of 99.5% ethanol were sequentially added to the dispersion solution. This mixture was sufficiently stirred to reach a substantially homogeneous state and then heated under conditions of 60° C. to 90° C. for 3 hours. After heating was completed, the obtained dispersion solution was repeatedly filtered and washed until the conductivity of a filtrate became 5 µS/cm or less. The obtained solid content was dried in air at 80° C. for 15 hours. The dried powder was heated at 700° C. in argon gas. The obtained carbon support (Pt supported 30 mass %) was dispersed in pure water having a mass 30 times the total mass of the carbon support. A cobalt nitrate aqueous solution was added dropwise to this dispersion solution until a molar ratio of Pt with respect to Co reached 7. The cobalt nitrate aqueous solution was prepared by dissolving commercially available cobalt nitrate hexahydrate in pure water. After the cobalt nitrate aqueous solution was added dropwise, sodium borohydride diluted in pure water was added dropwise to the obtained mixture until a molar ratio of Pt with respect to Co was in a range of 1 to 6. After the sodium borohydride was added dropwise, the obtained mixture was stirred for 1 hour to 20 hours. After the stirring, the obtained dispersion solution was repeatedly filtered and washed until the conductivity of the filtrate waste became 5 μS/cm or less. The obtained powder cake was dried in air at 80° C. for 15 hours. The dried powder was heated at 800° C. in argon gas and alloyed. According to this procedure, an electrode catalyst powder was obtained. When the particle size of catalyst particles containing PtCo was measured using X-ray diffraction (XRD), the average particle size of the catalyst particles was 3.1 nm.

I-1-2: Example 2

An electrode catalyst powder was prepared in the same manner as in Example 1 except that, in the procedures described in Example 1, when a carbon support was prepared, a heating treatment temperature of the first heating treatment process was changed to 60° C., a temperature raising rate of the second heating treatment process was changed to 10° C./min, and a heating treatment temperature was changed to 160° C. In the obtained carbon support, a plurality of pores had a mode size of pores in a value of 3.5 nm, and a total pore volume of the plurality of pores was 28 cm$^3$/g.

I-1-3: Example 3

An electrode catalyst powder was prepared in the same manner as in Example 1 except that, in the procedures described in Example 1, when a carbon support was prepared, a heating treatment temperature of the first heating treatment process was changed to 60° C., a temperature raising rate of the second heating treatment process was changed to 20° C./min, a heating treatment temperature was changed to 160° C., and a Pt loading amount when an electrode catalyst was prepared was changed to an amount (4.29 g) at which the Pt support amount was 30 mass % with respect to the total mass of the final product. In the obtained carbon support, a plurality of pores had a mode size of pores in a value of 4.1 nm and a total pore volume of the plurality of pores was 35 cm$^3$/g

I-1-4: Example 4

An electrode catalyst powder was prepared in the same manner as in Example 3 except that, in the procedures described in Example 3, instead of adding a nitric acid aqueous solution to an aqueous dispersion of a carbon support, the aqueous dispersion of the carbon support was dispersed using an ultrasonic homogenizer at an output of 500 W for 30 minutes, and the carbon support was degassed.

I-1-5: Example 5

An electrode catalyst powder was prepared in the same manner as in Example 3 except that, in the procedures described in Example 3, instead of adding a nitric acid aqueous solution to an aqueous dispersion of a carbon support, an ethanol aqueous solution (5 mass %) was added and the carbon support was degassed. The degassing ratio was 68%, and the average particle size of the catalyst particles was 3.1 nm.

I-1-6: Example 6

An electrode catalyst powder was prepared in the same manner as in Example 3 except that, in the procedures described in Example 3, instead of adding a nitric acid aqueous solution to an aqueous dispersion of a carbon support, 50 ppm ozone water was added and the carbon support was degassed.

I-1-7: Example 7

An electrode catalyst powder was prepared in the same manner as in Example 3 except that, in the procedures described in Example 3, a Pt loading amount when an electrode catalyst was prepared was changed to an amount (2.86 g) at which the Pt support amount was 20 mass % with respect to the total mass of the final product.

I-1-8: Example 8

An electrode catalyst powder was prepared in the same manner as in Example 3 except that, in the procedures described in Example 3, a Pt loading amount when an electrode catalyst was prepared was changed to an amount (7.5 g) at which the Pt support amount was 50 mass % with respect to the total mass of the final product.

I-1-9: Example 9

An electrode catalyst powder was prepared in the same manner as in Example 3 except that, in the procedures described in Example 3, instead of adding a nitric acid aqueous solution to an aqueous dispersion of a carbon support, the aqueous dispersion of the carbon support was maintained under a reduced pressure of 500 kPa, and the carbon support was degassed. The degassing ratio was 33%.

I-1-10: Example 10

An electrode catalyst powder was prepared in the same manner as in Example 3 except that, in the procedures described in Example 3, instead of adding a nitric acid aqueous solution to an aqueous dispersion of a carbon support, the aqueous dispersion of the carbon support was maintained under a reduced pressure of 100 kPa, and the carbon support was degassed. The degassing ratio was 65%.

I-2-1: Comparative Example 1

An electrode catalyst powder was prepared in the same manner as in Example 1 except that, in the procedures described in Example 1, instead of performing the processes of preparing a carbon support, a commercially available carbon support Denka black (FX35; commercially available from Denka) was directly used to prepare the electrode catalyst powder.

I-2-2: Comparative Example 2

An electrode catalyst powder was prepared in the same manner as in Example 1 except that, in the procedures described in Example 1, instead of performing the processes of preparing a carbon support, a commercially available carbon support Vulcan (commercially available from Cabot corporation) was directly used to prepare the electrode catalyst powder.

I-2-3: Comparative Example 3

An electrode catalyst powder was prepared in the same manner as in Example 1 except that, in the procedures described in Example 1, when a carbon support was prepared, a heating treatment temperature of the first heating treatment process, a temperature raising rate of the second heating treatment process, a heating treatment temperature, and a Pt loading amount when an electrode catalyst was prepared were changed. In the obtained carbon support, a plurality of pores had a mode size of pores in a value of 7.0 nm, and a total pore volume of the plurality of pores was 39 cm$^3$/g.

I-2-4: Comparative Example 4

An electrode catalyst powder was prepared in the same manner as in Example 3 except that, in the procedures described in Example 3, no nitric acid aqueous solution was added to the aqueous dispersion of the carbon support.

I-2-5: Comparative Example 5

An electrode catalyst powder was prepared in the same manner as in Example 1 except that, in the procedures described in Example 1, instead of performing the processes of preparing a carbon support, a commercially available carbon support Ketjen (commercially available from Lion Corporation) was directly used to prepare the electrode catalyst powder.

I-2-6: Comparative Example 6

An electrode catalyst powder was prepared in the same manner as in Example 3 except that, in the procedures described in Example 3, a Pt loading amount when an electrode catalyst was prepared was changed to an amount (8.18 g) at which the Pt support amount was 60 mass % with respect to the total mass of the final product.

I-2-7: Comparative Example 7

An electrode catalyst powder was prepared in the same manner as in Example 3 except that, in the procedures described in Example 3, instead of adding a nitric acid aqueous solution to an aqueous dispersion of a carbon support, the aqueous dispersion of the carbon support was maintained under a reduced pressure of 10 kPa, and the carbon support was degassed. The degassing ratio was 86%.

<II: Evaluation of Electrode Catalysts>
[II-1: Support Density of Catalytic Metal]

Catalytic metals Pt and Co in predetermined amounts of the electrode catalysts of the examples and the comparative examples were dissolved using aqua regia. Catalytic metal ions in the obtained solution were quantified using an ICP emission spectrometer (ICPV-8100; commercially available from Shimadzu). Based on the volume of the solution and a catalytic metal quantitative value in the solution, and loading amounts of the catalytic metals and a carbon loading amount, a support density (mass % with respect to the total mass of the electrode catalyst) of the catalytic metal supported on the electrode catalyst was determined.

[II-2: Average Particle Size of Catalyst Particles]

XRD of the electrode catalysts of the examples and the comparative examples was measured using an XRD device (Smart Lab; commercially available from RIGAKU). The measurement conditions were as follows: Cu tube, 3 mA. In the obtained XRD, a normal distribution curve was fitted to a peak pattern corresponding to the plane (220) of the catalytic metal crystal included in the catalyst particles. The half width of the fitted normal distribution curve was computed and the particle size of the catalyst particles was calculated on the basis of the obtained half width according to a known method (such as JISH7805).

[II-3: Pore Size Distribution of Electrode Catalyst]

Using a pore size distribution device (BELSORP-MR; commercially available from MicrotracBEL Corp.), an adsorption isotherm according to nitrogen gas of the carbon support included in the electrode catalysts of the examples and the comparative examples in a constant volume method was measured. The analysis of pore size distribution was performed using the BJH method. Based on the analysis results of pore size distribution, a mode size (nm) which is a pore size having the highest appearance ratio in the carbon support included in the electrode catalysts of the examples or the comparative examples and a total pore volume (cm$^3$/g) which is a pore volume of pores having a pore size in the entire range were determined.

[II-4: Distance Between Catalyst Particles and Surface of Carbon Support in Electrode Catalyst]

Using a 3-dimensional transmission electron microscope (3D-TEM) (HF-3310; commercially available from Hitachi High-Technologies Corporation), the electrode catalysts of the examples or the comparative examples were observed and carbon support (white transmission image) and catalytic metal (black non-transmission image) were distinguished. Catalyst particles containing a catalytic metal were identified one by one, and the closest distance between catalyst particles and a surface of a carbon support was measured using computation software for processing. The validity of computation results was checked with reference to results of observation using the 3D-TEM. The closest distance between catalyst particles and a surface of a carbon support was measured for all catalyst particles included in powder particles of one electrode catalyst. The relationship between a distance between catalyst particles and a surface of a carbon support and the number of catalyst particles having this distance was represented by a histogram. In addition, a cumulative frequency curve of a distance between catalyst particles and a surface of a carbon support was obtained from the histogram. From the cumulative frequency curve, a distance at which a distance between catalyst particles and a surface of a carbon support had a 50% cumulative frequency was determined. For the electrode catalysts of the examples or the comparative examples, 10 electrode catalyst powder particles were extracted, an experiment was performed according to the procedure, and an average value of distances at which a 50% cumulative frequency was obtained was calculated.

<III: Production of MEA>
[III-1: Preparation of Electrode Catalyst Ink]

Here, 10 mL of water was added to 1 g of the electrode catalyst of the examples or the comparative examples and stirring was performed. Here, 5 mL of ethanol was added thereto, stirring was performed using a stirring rod and sufficient suspension was performed. A solution of an ionomer (Nafion (registered trademark); commercially available from Du Pont) having an ion exchange equivalent (EW) of 910 was slowly added dropwise to this suspension. The ionomer solution was used in an amount at which a ratio (I/C) of the mass (I) of the solid content of the ionomer to the mass (C) of the carbon support included in the electrode catalyst was 1.0. After dropwise addition was completed, the mixed solution was dispersed using an ultrasonic homogenizer for 30 minutes to prepare an electrode catalyst ink. An MEA was produced using the obtained electrode catalyst ink. Using the MEA, CV measurement using a nonaqueous solvent and an aqueous solvent was performed. Then, a surface area of the electrode catalyst included in the obtained electrode catalyst ink and a surface area of the electrode catalyst covered with the ionomer were measured. Based on measurement values, a ratio (ionomer coating ratio) of the surface area of the electrode catalyst covered with the ionomer with respect to the total surface area of the electrode catalyst was determined.

[III-2: Production of Electrode Catalyst Layer]

The electrode catalyst ink of the examples or the comparative examples obtained in the procedure III-1 was uniformly applied to a surface of a substrate sheet using a squeegee. The coated substrate sheet was dried at 80° C. for 3 hours to form an electrode catalyst layer. The electrode catalyst ink was applied such that a mass of Pt included in the electrode catalyst per unit area of the coated surface was 0.3 mg-Pt/cm². In addition, as the substrate sheet, a polytetrafluoroethylene (PTFE) sheet was used.

[III-3: Production of MEA]

As a solid polymer electrolyte film, Nafion (registered trademark) 117 (commercially available from Du Pont) was used. The electrode catalyst layer of the examples or the comparative examples obtained in the procedure III-2 was used for both electrodes, an anode and a cathode. The solid polymer electrolyte film was interposed between the anode and the cathode, hot pressing was performed under conditions of 170° C. for 300 seconds for bonding, and an MEA was produced.

<IV: Evaluation of MEA>

[IV-1: I-V Characteristics]

I-V characteristics of the MEAs of the examples and the comparative examples were measured under conditions of a temperature of 65° C., no cathode humidification, a back pressure of 210 kPa, and a cathode stoichiometric ratio of 3. Voltage values (mV) at a specific current density (2.0 A/cm²) of the MEAs were compared.

[IV-2: Mass Activity]

While a dew point of both electrodes of the MEAs of the examples and the comparative examples was adjusted to 55° C., a relative humidity was adjusted to 80%, and a temperature was adjusted to 60° C., hydrogen (0.5 L/min, 50 kPa-G) was circulated to the anode and air (2 L/min, 50 kPa-G) was circulated to the cathode. A voltage value of 0.2 V at which the surface of an electrode catalyst particle was temporarily brought into a reduced state was maintained for several hours. Next, the voltage value was raised from 0.1 V to 0.9 V in units of 0.1 V such as 0.1 V, 0.2 V, or 0.3 V, and each voltage value was maintained for 3 minutes. A current density (A/cm²) at 0.88 V was divided by the total mass of Pt in the surface of the cathode electrode side to calculate a mass activity of the MEA of the examples and the comparative examples.

[IV-3: Gas Diffusion Resistance]

I-V characteristics of the MEAs of the examples and the comparative examples were measured while a reaction gas was adjusted for a low oxygen concentration environment (hydrogen concentration: 100%, oxygen concentration: several %) under conditions of a temperature of 45° C. and a relative humidity (RH) of 165%. In the I-V characteristics curve, a value of a current (limiting current) in a part in which the current value did not increase even if the voltage value decreased was divided by the surface area of the electrode catalyst layer to calculate a limiting current density. Based on the obtained limiting current density, and the temperature, the relative humidity and the oxygen concentration during measurement, a time required for oxygen in one molecule to move 1 m was calculated to determine the gas diffusion resistance.

<V: Evaluation Results of Electrode Catalyst and MEA>

Physical property values of the electrode catalysts of the examples and the comparative examples and performance values of the MEAs produced using the electrode catalysts are shown in Table 1.

TABLE 1

| | Pt support density | Average catalyst particle size (nm) | Mode size of pores (nm) | Pore volume (cm³/g) | Degassing ratio (%) | Distance at 50% cumulative frequency (nm) | Ionomer coating ratio (%) | Mass activity (A/g-Pt) | Gas diffusion resistance (sec/m) | Voltage @2.0 A/cm² (mV) |
|---|---|---|---|---|---|---|---|---|---|---|
| Example 1 | 30 | 3.1 | 2.1 | 21 | 39 | 3.5 | 75 | 115 | 102 | 0.64 |
| Example 2 | 30 | 3 | 3.5 | 28 | 48 | 5 | 70 | 125 | 102 | 0.65 |
| Example 3 | 30 | 2.5 | 4.1 | 35 | 50 | 10 | 65 | 140 | 106 | 0.64 |
| Example 4 | 30 | 3.2 | 4.1 | 35 | 33 | 2 | 66 | 110 | 105 | 0.63 |
| Example 5 | 30 | 3.1 | 4.1 | 35 | 68 | 7.5 | 64 | 137 | 100 | 0.66 |
| Example 6 | 30 | 3.1 | 4.1 | 35 | 55 | 11.5 | 66 | 134 | 115 | 0.62 |
| Example 7 | 20 | 2.8 | 4.1 | 35 | 40 | 12 | 60 | 144 | 118 | 0.62 |
| Example 8 | 50 | 4.1 | 4.1 | 35 | 38 | 9 | 69 | 138 | 105 | 0.65 |
| Example 9 | 30 | 2.5 | 4.1 | 35 | 33 | 3 | 66 | 112 | 105 | 0.64 |
| Example 10 | 30 | 5.1 | 5.1 | 35 | 65 | 6 | 63 | 134 | 102 | 0.67 |
| Comparative Example 1 | 30 | 3.3 | 0.5 | 5 | 5 | 0 | 96 | 70 | 110 | 0.58 |
| Comparative Example 2 | 30 | | 1 | 9 | 8 | 1.5 | 97 | 75 | 106 | 0.60 |
| Comparative Example 3 | 30 | 3.1 | 7 | 39 | 75 | 15 | 55 | 133 | 250 | 0.57 |
| Comparative Example 4 | 30 | 3.3 | 3.5 | 35 | 15 | 0.5 | 90 | 72 | 108 | 0.56 |
| Comparative Example 5 | 30 | 3.1 | 4 | 43 | 77 | 12.5 | 65 | 128 | 150 | 0.57 |
| Comparative Example 6 | 60 | | 4.1 | 35 | 42 | 1.5 | 85 | 90 | 102 | 0.59 |
| Comparative Example 7 | 30 | 2.9 | 4.1 | 35 | 86 | 15 | 62 | 145 | 230 | 0.58 |

Figure 3:
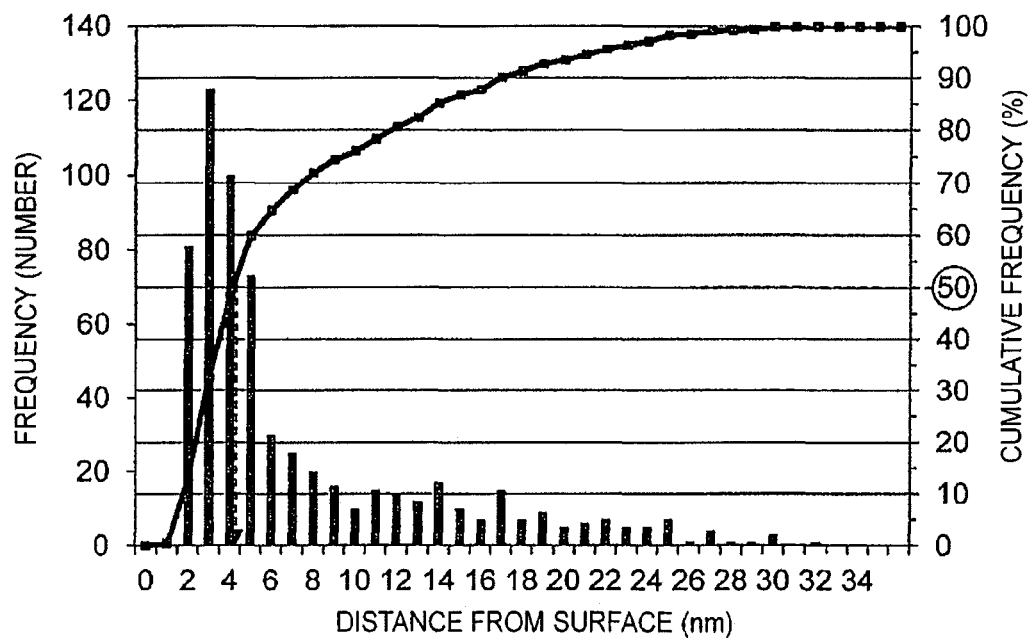
FIG. 3 shows a histogram showing the relationship between a distance between catalytic metal particles and a surface of a carbon support and the number of catalytic metal particles having a distance and a cumulative frequency curve of a distance between catalytic metal particles and a surface of a carbon support in the electrode catalyst of Example 2; black bars (left axis): the number of catalytic metal particles (number); black squares (right axis): cumulative frequency (%) of a distance between a catalytic metal particle and a surface of a carbon support.

FIG. 3 shows a histogram showing the relationship between a distance between catalytic metal particles and a surface of a carbon support and the number of catalytic metal particles having this distance and a cumulative frequency curve of a distance between catalytic metal particles and a surface of a carbon support in the electrode catalyst of Example 2. In FIG. 3, a black bar (left axis) represents the number of catalytic metal particles (number) and a black square (right axis) represents a cumulative frequency (%) of a distance between catalytic metal particles and a surface of a carbon support.

As shown in FIG. 3, in the electrode catalyst of Example 2, about 80% of catalyst particles were supported within a range of 2 nm to 12 nm as a distance from a surface of a carbon support. From the cumulative frequency curve, a distance between catalyst particles and a surface of a carbon support was determined to be 5.0 nm as a distance of a 50% cumulative frequency (indicated by the dotted line in the drawing).

Figure 4:
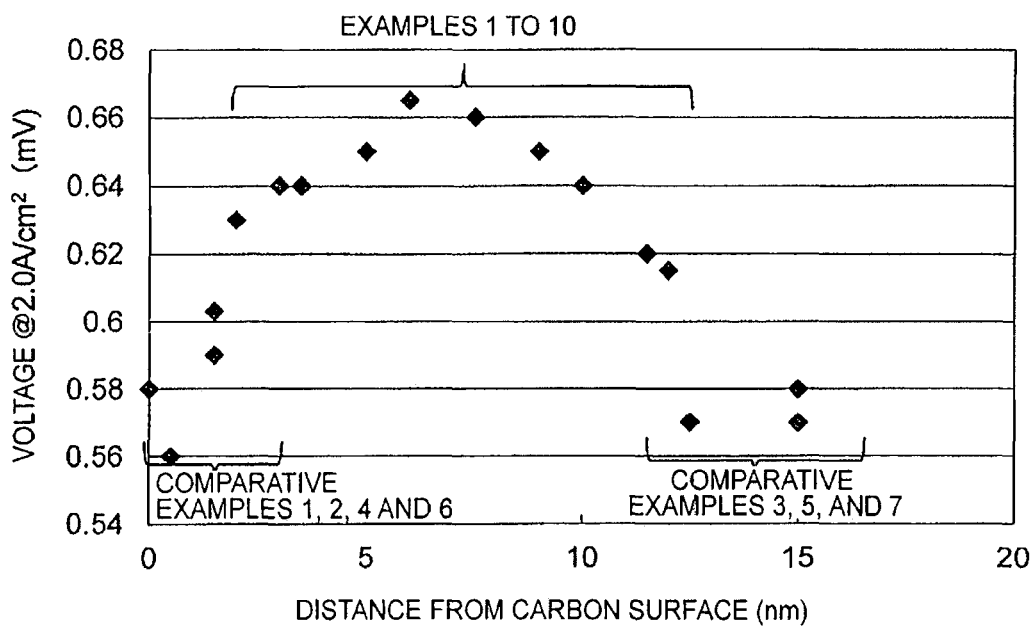
FIG. 4 is a diagram showing the relationship between a 50% cumulative frequency distance between catalytic metal particles and a surface of a carbon support and I-V characteristics of an MEA produced using the electrode catalyst in electrode catalysts of examples and comparative examples.
Figure 5:
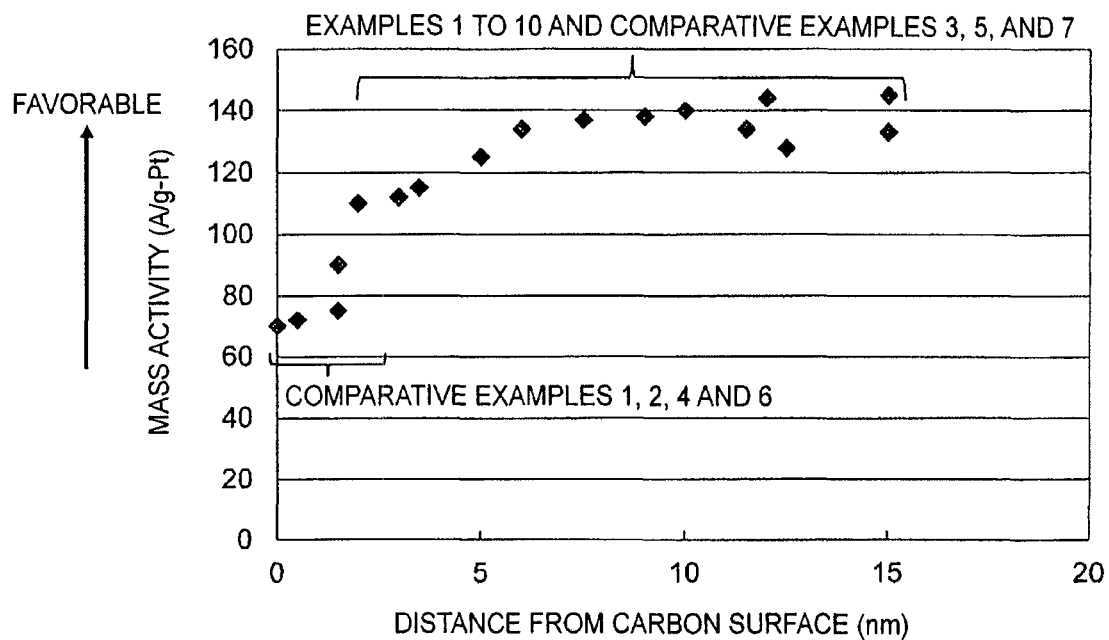
FIG. 5 is a diagram showing the relationship between a 50% cumulative frequency distance between catalytic metal particles and a surface of a carbon support and a mass activity of an MEA produced using the electrode catalyst in electrode catalysts of examples and comparative examples.
Figure 6:
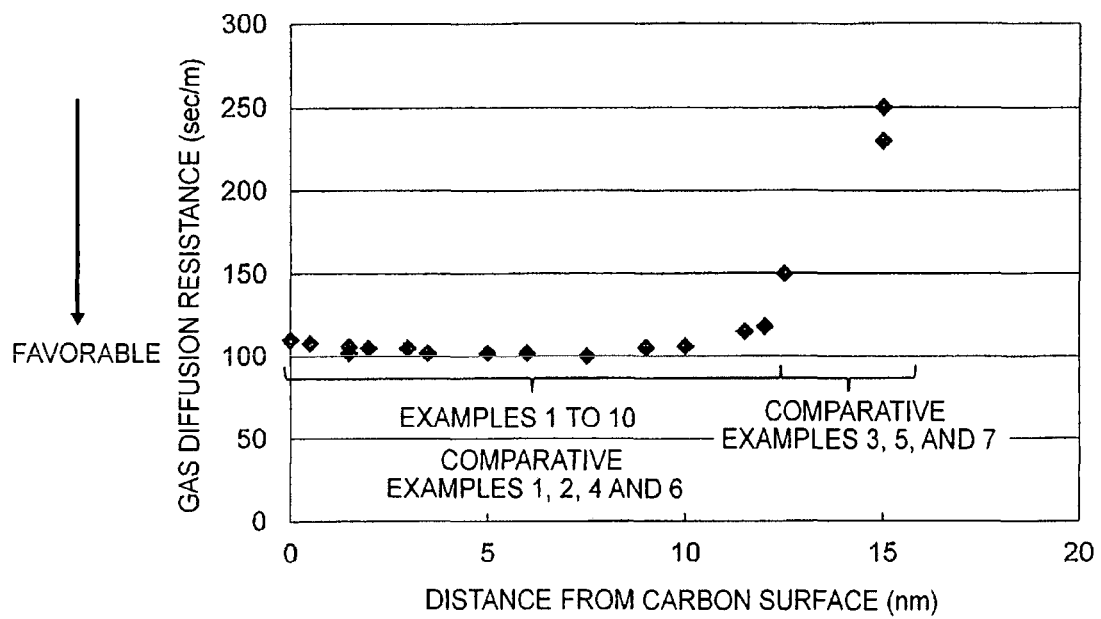
FIG. 6 is a diagram showing the relationship between a 50% cumulative frequency distance between catalytic metal particles and a surface of a carbon support and a gas diffusion resistance of an MEA produced using the electrode catalyst in electrode catalysts of examples and comparative examples.

FIG. 4 shows the relationship between a 50% cumulative frequency distance between catalytic metal particles and a surface of a carbon support and I-V characteristics of an MEA produced using the electrode catalyst in electrode catalysts of examples and comparative examples. FIG. 5 shows the relationship between a 50% cumulative frequency distance between catalytic metal particles and a surface of a carbon support and a mass activity of an MEA produced using the electrode catalysts. FIG. 6 shows the relationship between a 50% cumulative frequency distance between catalytic metal particles and a surface of a carbon support and a gas diffusion resistance of an MEA produced using the electrode catalysts.

As shown in FIGS. 4 to 6, when a distance between catalyst particles and a surface of a carbon support is in a range of 2.0 nm to 12 nm as a distance of a 50% cumulative frequency, favorable fuel cell performance was exhibited and low gas diffusion resistance was exhibited.

The invention claimed is:

1. An electrode catalyst for a fuel cell comprising:
   a carbon support having pores in the carbon support; and
   catalyst particles containing platinum or a platinum alloy supported on the carbon support,
   wherein the pores in the carbon support have a mode size of pores in a range of 2.1 nm to 5.1 nm,
   a total pore volume the pores in the carbon support is in a range of 21 $cm^3/g$ to 35 $cm^3/g$, and
   a distance between the catalyst particles and a surface of the carbon support is in a range of 2.0 nm to 12 nm as a distance of a 50% cumulative frequency.

2. The electrode catalyst for a fuel cell according to claim 1, wherein the distance between the catalyst particles and the surface of the carbon support is in a range of 3.0 nm to 12 nm as the distance of the 50% cumulative frequency.

3. The electrode catalyst for a fuel cell according to claim 1, wherein a particle size of the catalyst particles is in a range of 2.5 nm to 5.1 nm.

4. The electrode catalyst for a fuel cell according to claim 1, wherein the catalyst particles have a support density in a range of 20 mass % to 50 mass %.

5. A fuel cell comprising:
   the electrode catalyst for a fuel cell according to claim 1.

6. A production method of producing the electrode catalyst for a fuel cell according to claim 1, the method comprising:
   a degassing process in which (i) a carbon support is dispersed in water, the carbon support having pores in the carbon support with a mode size in a range of 2.1 nm to 5.1 nm, and a total pore volume of the pores in the carbon support being in a range of 21 $cm^3/g$ to 35 $cm^3/g$, and (ii) the carbon support is degassed until a proportion of a volume of pores in which water has entered with respect to a total pore volume of the pores in the carbon support is in a range of 33% to 68%;
   a catalytic metal salt supporting process in which the carbon support obtained in the degassing process is reacted with a catalytic metal material containing a salt of a catalytic metal, and the catalytic metal material is supported on the carbon support; and
   a catalyst particle forming process in which the salt of the catalytic metal contained in the catalytic metal material supported on the carbon support obtained in the catalytic metal salt supporting process is reduced to form platinum or a platinum alloy in a metallic form.

7. The production method according to claim 6, further comprising:
   a metal-containing solution preparing process in which a metal-containing solution that contains a metal or a salt thereof is prepared before the degassing process;
   a metal acetylide forming process in which the metal-containing solution and acetylene gas are mixed to form a metal acetylide;
   a first heating treatment process in which the metal acetylide is heated at a temperature in a range of 40° C. to 80° C. to form a metal particle containing intermediate; and
   a second heating treatment process in which the metal particle containing intermediate is heated so that pores are formed in the carbon support by erupting the metal contained in the metal particle containing intermediate while the temperature is raised to a range of 100° C. to 200° C. at a temperature raising rate in a range of 5° C./min to 100° C./min, and the carbon support in which the pores in the carbon support have a mode size of pores in a range of 2.1 nm to 5.1 nm, and a total pore volume of the pores in the carbon support is in a range of 21 $cm^3/g$ to 35 $cm^3/g$ is obtained.

\* \* \* \* \*